US009080658B2

(12) United States Patent
Eisenmenger et al.

(10) Patent No.: US 9,080,658 B2
(45) Date of Patent: Jul. 14, 2015

(54) ELECTROMAGNETIC CLUTCH FOR CONNECTING A STEAM ENGINE TO A COMBUSTION ENGINE

(75) Inventors: Nadja Eisenmenger, Stuttgart (DE); Achim Brenk, Kaempfelbach (DE); Hans-Christoph Magel, Reutlingen (DE); Andreas Wengert, Auenwald (DE)

(73) Assignee: Robert Bosch GmbH, Stuttgart (DE)

( * ) Notice: Subject to any disclaimer, the term of this patent is extended or adjusted under 35 U.S.C. 154(b) by 145 days.

(21) Appl. No.: 13/811,306

(22) PCT Filed: Jun. 8, 2011

(86) PCT No.: PCT/EP2011/059506
§ 371 (c)(1),
(2), (4) Date: Jan. 21, 2013

(87) PCT Pub. No.: WO2012/010372
PCT Pub. Date: Jan. 26, 2012

(65) Prior Publication Data
US 2013/0174693 A1    Jul. 11, 2013

(30) Foreign Application Priority Data
Jul. 19, 2010  (DE) .......................... 10 2010 031 498

(51) Int. Cl.
*F16D 13/04* (2006.01)
*F16H 37/06* (2006.01)
*F16D 27/11* (2006.01)
*F16D 27/118* (2006.01)
*F16D 47/04* (2006.01)
*F02G 5/04* (2006.01)

(52) U.S. Cl.
CPC ............... *F16H 37/065* (2013.01); *F02G 5/04* (2013.01); *F16D 27/11* (2013.01); *F16D 27/118* (2013.01); *F16D 47/04* (2013.01); *Y02T 10/166* (2013.01); *Y10T 74/19014* (2015.01)

(58) Field of Classification Search
USPC ........... 74/661; 60/615, 618; 192/41 R, 84.31
See application file for complete search history.

(56) References Cited

U.S. PATENT DOCUMENTS 4,031,705 A * 6/1977 Berg ............................... 60/615
4,300,353 A * 11/1981 Ridgway ......................... 60/618
8,726,750 B2 * 5/2014 Baasch et al. .................. 74/335

FOREIGN PATENT DOCUMENTS

| CN | 201047409 | 4/2008 |
| GB | 1554766 | 10/1979 |
| WO | 2004/065811 | 8/2004 |
| WO | 2010/079386 | 7/2010 |
| WO | 2010/099941 | 9/2010 |

OTHER PUBLICATIONS

International Search Report for Application No. PCT/EP2011/059506 dated Sep. 14, 2011 (English Translation and Original, 4 pages).

* cited by examiner

*Primary Examiner* — Ha D Ho
(74) *Attorney, Agent, or Firm* — Michael Best & Friedrich LLP

(57) ABSTRACT

An electromagnetic clutch (4) which serves for connecting a steam engine (2) to a combustion engine (3), wherein a first shaft (8) which can be driven by the steam engine (2) and a second shaft (9) which can be driven by the internal combustion engine (3) are provided, wherein an intermediate gear (23) which is connected to the first shaft (8) and a clutch bell (26) which is at least indirectly connected to the second shaft (9) are provided, wherein a freewheel (27) is provided between the intermediate gear (23) and the clutch bell (26).

22 Claims, 3 Drawing Sheets

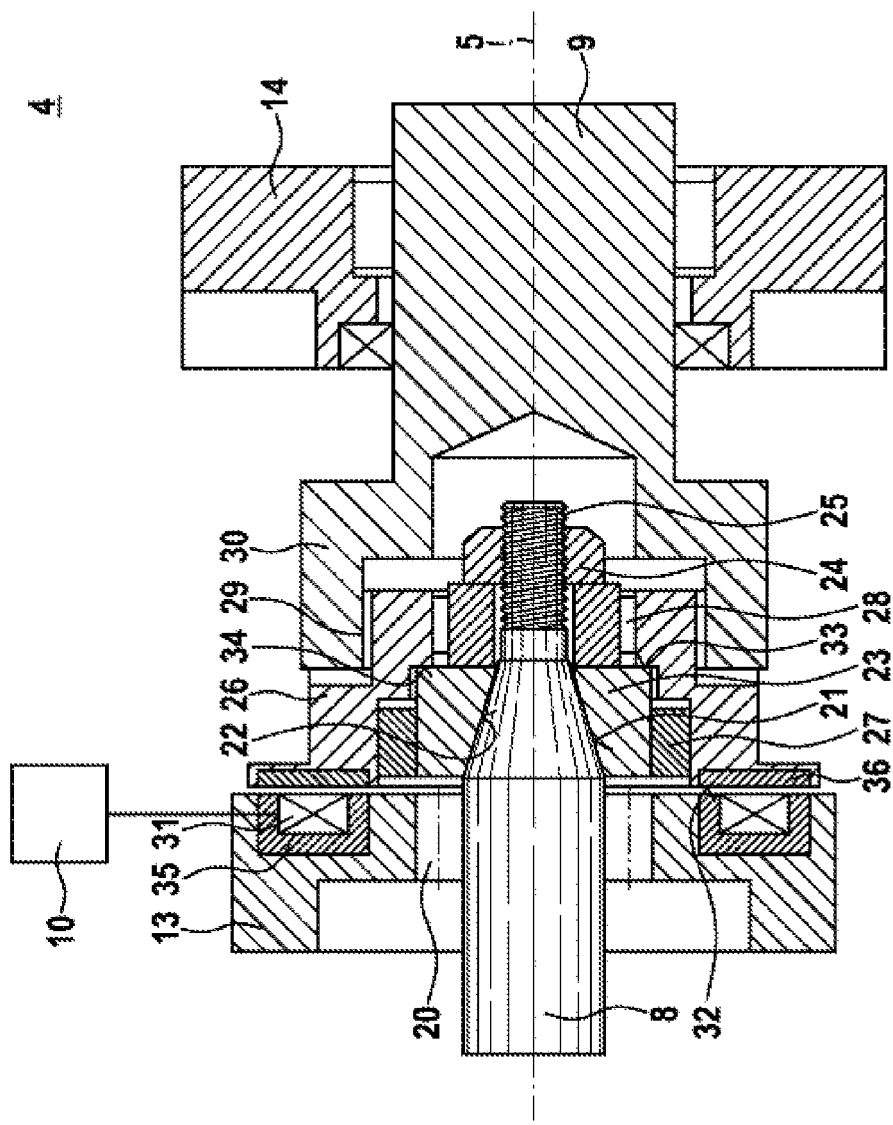

ELECTROMAGNETIC CLUTCH FOR CONNECTING A STEAM ENGINE TO A COMBUSTION ENGINE

BACKGROUND OF THE INVENTION

The invention relates to the field of steam engines which can be operated using a steam power process and which are connected to an internal combustion engine.

In the development of internal combustion engines, the reduction of fuel consumption is of high importance. Internal combustion engines convert the energy of the fuel into mechanical energy for driving vehicles. Here, a large proportion of the energy is released as waste heat which is dissipated by the cooling system or conducted away from the internal combustion engine in the exhaust gas. To utilize said energy, it is conceivable for the internal combustion engine to be coupled to a steam power process. Here, the heat energy from the internal combustion engine is used to generate steam, which is expanded in an expansion machine and thus provides further energy which can be utilized for driving the vehicle.

The combination of an internal combustion engine with a steam engine for waste heat utilization is particularly suitable for a utility vehicle because, here, the internal combustion engine must output a large amount of power, and therefore a large amount of heat energy is available for steam generation.

For the connection of the steam engine to the internal combustion engine, it is conceivable for a rigid coupling to be provided. This means, however, that the internal combustion engine carries the steam engine along already from the time at which said internal combustion engine is started, even though sufficient steam pressure for the steam engine is not yet available. This yields the disadvantage that, specifically during the starting of the internal combustion engine, the efficiency of the overall system is decreased corresponding to the friction of the steam engine. However, in this way, the steam engine can be set in motion by the internal combustion engine by being carried along, such that the steam engine does not remain stationary in an unfavorable position in which it possibly cannot start up of its own accord.

It is also conceivable for the steam engine and the internal combustion engine to be connected to one another via an interposed freewheel. In this way, the internal combustion engine can rotate freely when sufficient steam pressure for the steam engine is not available. In this situation, therefore, the internal combustion engine need not impart the additional power lost through friction of the steam engine. Here, however, there is the disadvantage that the internal combustion engine no longer sets the steam engine in motion by carrying the latter along, as a result of which, in the case of unfavorable standstill positions of the steam engine, depending on the design thereof, said steam engine can possibly no longer start up of its own accord.

SUMMARY OF THE INVENTION

The electromagnetic clutch according to the invention has the advantage that it is made possible for the steam engine to be set in motion by the internal combustion engine by being carried along, with improved efficiency of the overall system.

The steam engine is advantageously designed as a piston engine. Here, various types of piston engines are possible. In this way, specifically for applications in motor vehicles, it is possible to obtain an optimized design of the steam engine and therefore a high efficiency. The steam engine may however also be designed as some other expansion machine or else as a turbine. Depending on the type, the different types of steam engine are capable of starting of their own accord when steam pressure is available. However, specifically in the case of piston-type steam engines with a small number of cylinders, which are also advantageous from cost and installation space aspects, there is often the problem that these are not capable of starting up by themselves. As a result of the freewheel between the internal combustion engine and the steam engine, it is possible for an undesired decrease in efficiency to initially be avoided in the starting phase. When the required steam pressure has built up, frictional locking can be produced by means of the electromagnetic actuation force in order to bridge the freewheel. It is also possible for positive locking to be generated in order to bridge the freewheel.

It is therefore possible, after the warm-up phase and when sufficient steam pressure is available, for the rotational movement of the internal combustion engine to be transmitted to the steam engine by means of the electromagnetic actuation, which bridges the freewheel either by frictional locking or by positive locking. The internal combustion engine can thus serve as a starter for the steam engine. After the starting process, the electromagnetic actuation can be deactivated again. The steam engine can now output its power to the internal combustion engine via the freewheel, which is now engaged.

It is particularly advantageous for a frictional force to be generated between the intermediate gear and the clutch bell by the electromagnetic actuation force. In this way, upon the activation of the actuation in order to bridge the freewheel, advantageous driving of the first shaft for the purpose of starting the steam engine is made possible. In this way, uniform starting-up of the steam engine is ensured even in the case of relatively high rotational speeds of the internal combustion engine.

It is advantageous for the intermediate gear to have a conical friction surface, for the clutch bell to have a conical friction surface, for the conical friction surface of the intermediate gear and the conical friction surface of the clutch bell to face toward one another, and for the conical friction surface of the intermediate gear and the conical friction surface of the clutch bell to be loaded against one another by the electromagnetic actuation force. In this way, it is possible for a high friction force to be generated with a compact design, as a result of which high forces can be transmitted from the internal combustion engine to the steam engine for the purpose of starting the steam engine.

It is however also advantageous for the intermediate gear to have an annular friction surface, for the clutch bell to have an annular friction surface, for the annular friction surface of the intermediate gear and the annular friction surface of the clutch bell to be oriented perpendicular to an axis of rotation of the first shaft and to face toward one another, and for the annular friction surface of the intermediate gear and the annular friction surface of the clutch bell to be loaded against one another by the electromagnetic actuation force. An advantageous opening and closing of the friction connection between the clutch bell and the intermediate gear is made possible in this way.

It is also advantageous for the clutch bell to be formed at least partially from a ferromagnetic material. In this way, the clutch bell can be actuated for example by an electromagnet in order to produce the frictional locking. It is also possible for one or more ferromagnetic elements to be arranged on the clutch bell. Such ferromagnetic elements may for example be inserted into the clutch bell or connected to the clutch bell. Here, one or more electromagnets are assigned to the ferromagnetic elements.

It is also advantageous for the steam engine to have a housing part, for an end side of the clutch bell to face toward the housing part, and for an electromagnet to be arranged on the housing part, which electromagnet is assigned to the end side of the clutch bell. In this way, a compact design of the overall system is possible. It is also advantageous here for the housing part of the steam engine to be formed from a ferromagnetic material.

It is also advantageous for the clutch bell to be connected to the second shaft via a flexible coupling. Such a flexible coupling may be designed for example as a claw coupling. It is thus possible, during normal operation of the steam engine with the freewheel engaged, for the torque to be transmitted via the claw coupling to the second shaft, which may be a shaft of the internal combustion engine.

It is also advantageous for the first shaft to have a conical portion, for the intermediate gear to have a conical receptacle which receives the conical portion of the first shaft, and, for the connection of the intermediate gear to the first shaft, for the conical portion to be loaded against the conical receptacle by means of a clamping nut. In this way, it is possible to realize a reliable connection with a compact design.

It is also advantageous for a controller to be provided and for the controller to be designed to demand the generation of the electromagnetic actuation force for the purpose of starting the steam engine. Here, in order to bridge the freewheel when the steam pressure is sufficiently high, the controller may actuate the magnet coil directly or via an electrical or electronic switch. After the starting of the steam engine, the controller can withdraw the electromagnetic actuation force again, such that the transmission of force from the steam engine to the internal combustion engine takes place via the engaged freewheel.

BRIEF DESCRIPTION OF THE DRAWINGS

Preferred exemplary embodiments of the invention are explained in more detail in the following description with reference to the appended drawings, in which corresponding elements are denoted by corresponding reference symbols and in which:

FIG. 3 shows the electromagnetic clutch illustrated in FIG. 2, according to a second exemplary embodiment of the invention.

DETAILED DESCRIPTION

Figure 1:
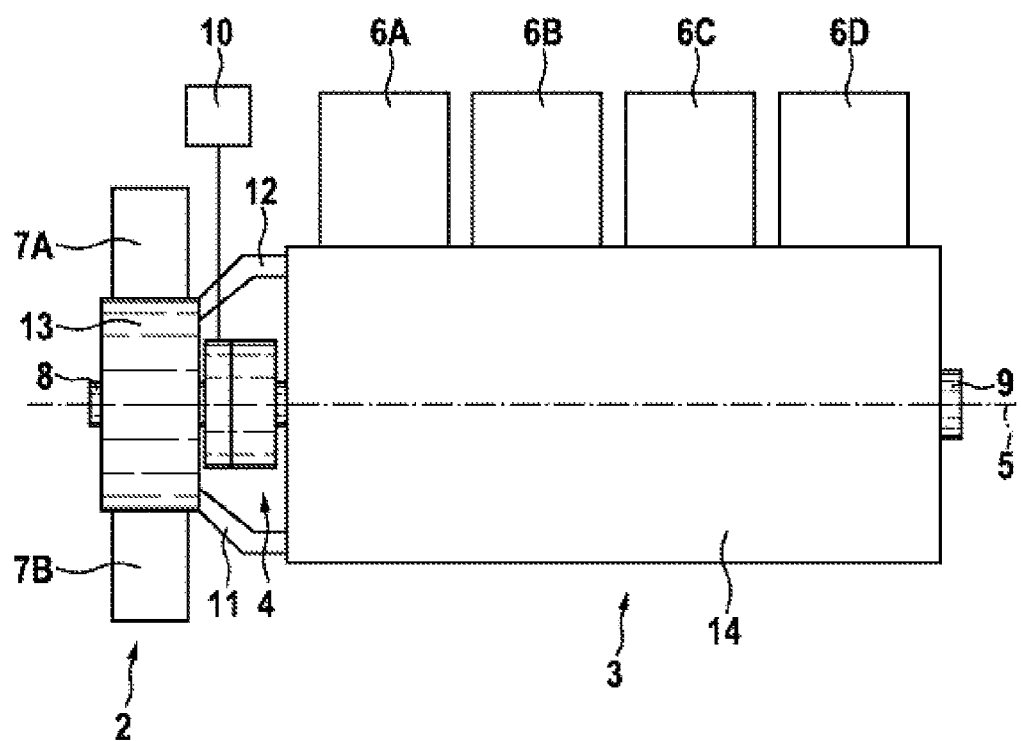
FIG. 1 shows an arrangement having an internal combustion engine and a steam engine, which are connected to one another via an electromagnetic clutch, in a schematic illustration according to one possible configuration of the invention.

FIG. 1 shows an arrangement 1 having a steam engine 2 and having an internal combustion engine 3, which are connected to one another via an electromagnetic clutch 4, according to one possible configuration of the invention. Here, the electromagnetic clutch 4 need not imperatively be configured in a fixed arrangement with the steam engine 2 and the internal combustion engine 3 and may be produced and marketed independently of the steam engine 2 and the internal combustion engine 3. In the specific application, in particular in a motor vehicle, for example a utility vehicle, the electromagnetic clutch 4 may be mounted, corresponding to the arrangement 1, between the steam engine 2 and the internal combustion engine 3. Other arrangements are however also possible. In particular, instead of a common axis of rotation 5 of the steam engine 2 and of the internal combustion engine 3, a plurality of different axes of rotation may also be provided. Specifically, the steam engine 2 may also be arranged on the side of the internal combustion engine 3, wherein a mechanism via toothed belts or toothed gears permits a transmission of the torque.

In this exemplary embodiment, the internal combustion engine 3 has four cylinders 6A, 6B, 6C, 6D. Furthermore, the steam engine 2 has mutually opposed cylinders 7A, 7B. The cylinders 7A, 7B of the steam engine 2 act on a first shaft 8 which can be driven by the steam engine 2. In this exemplary embodiment, the first shaft 8 is the shaft of the steam engine 2. The cylinders 6A to 6D act on a second shaft 9, which can thus be driven by the internal combustion engine 3. In this exemplary embodiment, the shaft 9 is a shaft of the internal combustion engine 3.

The electromagnetic clutch 4 is arranged between the steam engine 2 and the internal combustion engine 3. The electromagnetic clutch 4 comprises the first shaft 8 and the second shaft 9. Since the first shaft 8 is simultaneously the shaft 8 of the steam engine 2 and the second shaft 9 is simultaneously the shaft of the internal combustion engine 3, a compact configuration of the arrangement 1 is obtained in this exemplary embodiment. However, the individual shafts may also be connected to one another via suitable mechanisms, in particular toothed belts or toothed gears.

The electromagnetic clutch 4 also comprises a controller 10. Here, the controller 10 may be part of, or may be activated by, a central or peripheral controller of the motor vehicle. Also provided are holding arms 11, 12 which connect a housing part 13 of the steam engine 2 to an engine block 14 of the internal combustion engine 3.

Figure 2:
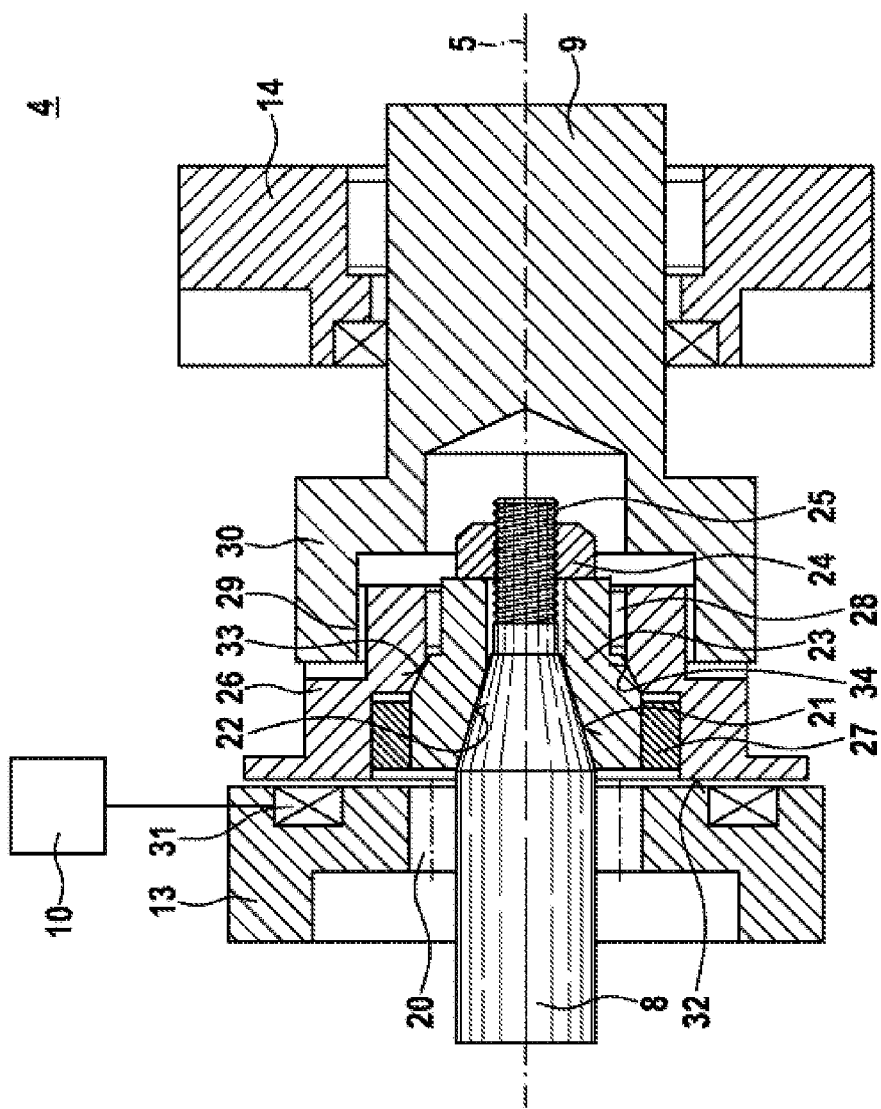
FIG. 2 shows the electromagnetic clutch illustrated in FIG. 1, according to a first exemplary embodiment, in a schematic sectional illustration.

FIG. 2 shows the electromagnetic clutch 4 illustrated in FIG. 1, according to a first exemplary embodiment, in a schematic sectional illustration. In this exemplary embodiment, the first shaft 8 is mounted in the housing part 13 by means of a bearing 20. The first shaft 8 has a conical portion 21 which is inserted into a conical recess 22 of an intermediate gear 23. In this way, the intermediate gear 23 is mounted on the first shaft 8. Also provided is a clamping nut 24 which is screwed onto a thread 25 at an end of the first shaft 8. The intermediate gear 23 is pressed against the conical portion 21 of the first shaft 8 by the clamping nut 24, such that a frictionally locking connection is formed between the first shaft 8 and the intermediate gear 23. The intermediate gear 23 is thus screwed onto the first shaft 8 in a reliable manner by means of the clamping nut 24.

The clutch 4 also comprises a clutch bell 26. A freewheel 27 is provided between the clutch bell 26 and the intermediate gear 23. The freewheel 27 is designed such that the clutch bell 26 can freewheel about the axis of rotation 5 correspondingly to a direction of rotation of the second shaft 9. On the other hand, during such a rotational movement, the intermediate gear 23 drives the clutch bell 26 via the freewheel 27. A bearing 28 is also provided as an additional support, which bearing may if appropriate also be omitted.

The clutch bell 26 can thus also freewheel relative to the first shaft 8 correspondingly to the direction of rotation of the second shaft 9, which is predefined by the internal combustion engine 3 owing to the operating principle thereof. Specifically, when the steam engine 2 is at a standstill, it is thus possible for the internal combustion engine 3 to start up without the steam engine 2 being driven. In this way, firstly the starting of the internal combustion engine 3 is facilitated, and secondly the efficiency in the starting phase is improved.

By contrast, if the steam engine 2 is running, then it is possible for the torque of the steam engine 2 to be transmitted from the first shaft 8 to the second shaft 9 via the now engaged freewheel 27.

Therefore, during normal operation of the steam engine 2 which is arranged on the internal combustion engine 3, the freewheel 27 is engaged and the torque can be transmitted. Here, the clutch bell 26 can be transmitted from the clutch bell 26 to the second shaft 9 via a flexible coupling 29. Here, a claw 30 may be provided on the second shaft 9. The flexible coupling 29 is then designed as a claw coupling 29. It is thus possible for the torque of the steam engine 2 to be transmitted via the engaged freewheel 27 and the flexible coupling 29 to the second shaft 9 of the internal combustion engine 3.

If the internal combustion engine 3 is started and the engine block 14 is still cold, then sufficient waste heat for building up a steam pressure, required for the operation of the steam engine 2, in the associated steam circuit is generally also not available. By means of the now active freewheel 27, it is possible for the internal combustion engine 3 to start without the steam engine 2 having to be carried along.

When sufficient steam pressure has built up owing to the waste heat of the internal combustion engine 3, then the controller 10 demands an electromagnetic actuation of the electromagnetic clutch 4.

In this exemplary embodiment, the housing part 13 is formed from ferromagnetic material. Here, there is inserted into the housing part 13 of the steam engine 2 a magnet coil 31 which is connected to the controller 10 directly or via an electrical or electronic switch. When the controller 10 supplies electrical current to the magnet coil 31, then the electromagnet 13, 31 formed from the housing part 13 and the magnet coil 31 is activated. In this exemplary embodiment, the clutch bell 26 is also formed from a ferromagnetic material. When the magnet 13, 31 is activated, the clutch bell 26 is thus loaded with an electromagnetic actuating force in the direction of the housing part 13. Here, an end surface 32 of the clutch bell 26 is advantageously assigned to the magnet 13, 31.

The clutch bell 26 is mounted such that it can be displaced axially over the bearing 28 and the still-disengaged freewheel 27. As a result of the actuation force, an axial displacement of the clutch bell 26 is now effected until the clutch bell 26 bears against the intermediate gear 23.

In this exemplary embodiment, the intermediate gear 23 has a conical friction surface 33 which interacts with a conical friction surface 34 of the clutch bell 26. As a result of the electromagnetic actuation force, frictional locking is produced between the conical friction surface 33 of the intermediate gear 23 and the conical friction surface 34 of the clutch bell 26. As a result of the friction generated, the steam engine 2 is set in motion by being carried along and is driven.

When the steam engine 2 has at least approximately reached the rotational speed of the internal combustion engine 3 and continues to run under its own power or can even transmit an additional torque to the internal combustion engine 3, the magnet coil 31 is deactivated again. The frictional locking between the friction surfaces 33, 34 is thus eliminated again. In said operating state, the freewheel 27 is engaged, such that the steam engine 2 can output its work to the internal combustion engine 3.

Depending on the configuration of the arrangement 1, therefore, the rotational speed of the first shaft 8 is brought in line with the rotational speed of the second shaft 9 by energization of the magnet coil 31 and thus actuation of the clutch bell 26. The first shaft 8 subsequently runs at the rotational speed of the second shaft 9, wherein a transmission of an additional torque from the first shaft 8 to the second shaft 9 is possible via the engaged freewheel 27.

It is thus possible in particular to ensure the realization of a starting aid for the steam engine 2.

FIG. 3 shows the electromagnetic clutch 4 illustrated in FIG. 2, according to a second exemplary embodiment. In this exemplary embodiment, the electromagnet 31, 35 is formed by a ferromagnetic element 35 and the magnet coil 31. Here, the ferromagnetic element 35 is inserted into the housing part 13. The housing part 13 may thus be formed from a non-magnetic material. Furthermore, in this exemplary embodiment, the clutch bell 26 is also formed from a non-magnetic material. A ferromagnetic element 36 is thus inserted into the clutch bell 26. Here, it is also possible for a plurality of ferromagnetic elements to be provided on the housing part 13 and/or on the clutch bell 26. The ferromagnetic element 36 is arranged in the region of the end surface 32 of the clutch bell 26 and is assigned to the magnet 31, 35. As a result of energization of the magnet coil 31, the electromagnet 31, 35 generates an electromagnetic actuation force on the ferromagnetic element 36, which leads to an adjustment of the clutch bell 26.

Furthermore, in this exemplary embodiment, the friction surface 33 on the intermediate gear 23 is designed as an annular friction surface 33. Furthermore, the friction surface 34 on the clutch bell 26 is also designed as an annular friction surface 34. Here, the friction surfaces 33, 34 are oriented perpendicular to the axis of rotation 5. Furthermore, the friction surfaces 33, 34 face toward one another. It is thus possible for frictional locking to be generated by means of the friction surfaces 33, 34 oriented perpendicular to the actuation force.

It should be noted that some other combination of the described variants is also possible. In particular, the annular friction surfaces 33, 34 which have been described on the basis of FIG. 3 may also be used in the exemplary embodiment described on the basis of FIG. 2, in which the housing part 13 and the clutch bell 26 are formed from ferromagnetic materials.

In the configuration of the electromagnet 31, 35 described on the basis of FIG. 3, the electromagnet may be produced as a preassembled unit, which is then installed in the housing 13 of the steam engine 2. In this way, the regions around the magnetic circuit may be formed as separate components.

The invention is not restricted to the exemplary embodiments described.

The invention claimed is:

1. An electromagnetic clutch (4) which serves for connecting a steam engine (2) to a combustion engine (3), wherein a first shaft (8) which can be driven by the steam engine (2) and a second shaft (9) which can be driven by the internal combustion engine (3) are provided, wherein an intermediate gear (23) which is connected to the first shaft (8) and a clutch bell (26) which is at least indirectly connected to the second shaft (9) are provided, wherein a freewheel (27) is provided between the intermediate gear (23) and the clutch bell (26), which freewheel serves to transmit a rotational movement from the intermediate gear (23), which is connected to the first shaft (8), to the clutch bell (26) and permits freewheeling of the clutch bell (26) relative to the intermediate gear (23), and wherein at least one of a friction force and a positive locking can be generated between the intermediate gear (23) and the clutch bell (26) by an electromagnetic actuation force, and characterized in that the intermediate gear (23) has a conical friction surface (33), in that the clutch bell (26) has a conical friction surface (34), in that the conical friction surface (33) of the intermediate gear (23) and the conical friction surface (34) of the clutch bell (26) face toward one another, and in that the conical friction surface (33) of the intermediate gear (23) and the conical friction surface (34) of the clutch bell (26) are loaded against one another by the electromagnetic actuation force.

2. The electromagnetic clutch as claimed in claim 1, characterized in that the clutch bell (26) is formed at least partially from a ferromagnetic material.

3. The electromagnetic clutch as claimed in claim 1, characterized in that the steam engine (2) has a housing part (13), in that an end side (32) of the clutch bell (26) faces toward the housing part (13), and in that an electromagnet (31) is arranged on the housing part (13), which electromagnet is assigned to the end side of the clutch bell.

4. The electromagnetic clutch as claimed in claim 3, characterized in that the housing part (13) of the steam engine (2) is formed from a ferromagnetic material.

5. The electromagnetic clutch as claimed in claim 1, characterized in that the clutch bell (26) is connected to the second shaft (9) via a flexible coupling (29).

6. The electromagnetic clutch as claimed in claim 5, characterized in that the flexible coupling (29) is designed as a claw coupling (29, 30).

7. The electromagnetic clutch as claimed in claim 1, characterized in that the first shaft (8) has a conical portion (21), in that the intermediate gear (23) has a conical receptacle (22) which receives the conical portion (21) of the first shaft (8), and in that, for connection of the intermediate gear (23) to the first shaft (8), the conical portion (21) is loaded against the conical receptacle (22) by means of a clamping nut (24).

8. The electromagnetic clutch as claimed in claim 1, characterized in that a controller (10) is provided, and in that the controller is designed to demand the generation of the electromagnetic actuation force for the purpose of starting the steam engine (2).

9. The electromagnetic clutch as claimed in claim 1, characterized in that at least one ferromagnetic element (36) is arranged on the clutch bell (26).

10. The electromagnetic clutch as claimed in claim 9, characterized in that the clutch bell (26) is formed at least partially from a ferromagnetic material.

11. An electromagnetic clutch (4) which serves for connecting a steam engine (2) to a combustion engine (3), wherein a first shaft (8) which can be driven by the steam engine (2) and a second shaft (9) which can be driven by the internal combustion engine (3) are provided, wherein an intermediate gear (23) which is connected to the first shaft (8) and a clutch bell (26) which is at least indirectly connected to the second shaft (9) are provided, wherein a freewheel (27) is provided between the intermediate gear (23) and the clutch bell (26), which freewheel serves to transmit a rotational movement from the intermediate gear (23), which is connected to the first shaft (8), to the clutch bell (26) and permits freewheeling of the clutch bell (26) relative to the intermediate gear (23), and wherein at least one of a friction force and a positive locking can be generated between the intermediate gear (23) and the clutch bell (26) by an electromagnetic actuation force, and characterized in that the intermediate gear (23) has an annular friction surface (33), in that the clutch bell (26) has an annular friction surface (34), in that the annular friction surface (33) of the intermediate gear (23) and the annular friction surface (34) of the clutch bell (26) are oriented perpendicular to an axis of rotation (5) of the first shaft (8) and face toward one another, and in that the annular friction surface (33) of the intermediate gear (23) and the annular friction surface (34) of the clutch bell (26) are loaded against one another by the electromagnetic actuation force.

12. The electromagnetic clutch as claimed in claim 11, characterized in that the clutch bell (26) is formed at least partially from a ferromagnetic material.

13. The electromagnetic clutch as claimed in claim 11, characterized in that the steam engine (2) has a housing part (13), in that an end side (32) of the clutch bell (26) faces toward the housing part (13), and in that an electromagnet (31) is arranged on the housing part (13), which electromagnet is assigned to the end side of the clutch bell.

14. The electromagnetic clutch as claimed in claim 13, characterized in that the housing part (13) of the steam engine (2) is formed from a ferromagnetic material.

15. The electromagnetic clutch as claimed in claim 11, characterized in that the clutch bell (26) is connected to the second shaft (9) via a flexible coupling (29).

16. The electromagnetic clutch as claimed in claim 15, characterized in that the flexible coupling (29) is designed as a claw coupling (29, 30).

17. The electromagnetic clutch as claimed in claim 11, characterized in that the first shaft (8) has a conical portion (21), in that the intermediate gear (23) has a conical receptacle (22) which receives the conical portion (21) of the first shaft (8), and in that, for connection of the intermediate gear (23) to the first shaft (8), the conical portion (21) is loaded against the conical receptacle (22) by means of a clamping nut (24).

18. The electromagnetic clutch as claimed in claim 11, characterized in that a controller (10) is provided, and in that the controller is designed to demand the generation of the electromagnetic actuation force for the purpose of starting the steam engine (2).

19. The electromagnetic clutch as claimed in claim 11, characterized in that at least one ferromagnetic element (36) is arranged on the clutch bell (26).

20. The electromagnetic clutch as claimed in claim 19, characterized in that the clutch bell (26) is formed at least partially from a ferromagnetic material.

21. An electromagnetic clutch (4) which serves for connecting a steam engine (2) to a combustion engine (3), wherein a first shaft (8) which can be driven by the steam engine (2) and a second shaft (9) which can be driven by the internal combustion engine (3) are provided, wherein an intermediate gear (23) which is connected to the first shaft (8) and a clutch bell (26) which is at least indirectly connected to the second shaft (9) are provided, wherein a freewheel (27) is provided between the intermediate gear (23) and the clutch bell (26), which freewheel serves to transmit a rotational movement from the intermediate gear (23), which is connected to the first shaft (8), to the clutch bell (26) and permits freewheeling of the clutch bell (26) relative to the intermediate gear (23), and wherein at least one of a friction force and a positive locking can be generated between the intermediate gear (23) and the clutch bell (26) by an electromagnetic actuation force, and characterized in that the first shaft (8) has a conical portion (21), in that the intermediate gear (23) has a conical receptacle (22) which receives the conical portion (21) of the first shaft (8), and in that, for connection of the intermediate gear (23) to the first shaft (8), the conical portion (21) is loaded against the conical receptacle (22) by means of a clamping nut (24).

22. The electromagnetic clutch as claimed in claim 21, characterized in that a controller (10) is provided, and in that the controller is designed to demand the generation of the electromagnetic actuation force for the purpose of starting the steam engine (2).

* * * * *